United States Patent
Clark

(10) Patent No.: US 9,644,820 B2
(45) Date of Patent: May 9, 2017

(54) LIGHT-WEIGHT LIGHTING FIXTURE

(71) Applicant: 3form, LLC, Salt Lake City, UT (US)

(72) Inventor: W. Bruce Clark, Redmond, WA (US)

(73) Assignee: 3FORM, LLC, Salt Lake City, UT (US)

( * ) Notice: Subject to any disclaimer, the term of this patent is extended or adjusted under 35 U.S.C. 154(b) by 0 days.

(21) Appl. No.: 14/646,232

(22) PCT Filed: Nov. 15, 2013

(86) PCT No.: PCT/US2013/070236
§ 371 (c)(1),
(2) Date: May 20, 2015

(87) PCT Pub. No.: WO2014/081621
PCT Pub. Date: May 30, 2014

(65) Prior Publication Data
US 2015/0300605 A1    Oct. 22, 2015

Related U.S. Application Data

(60) Provisional application No. 61/728,461, filed on Nov. 20, 2012.

(51) Int. Cl.
*F21S 13/10* (2006.01)
*F21V 17/06* (2006.01)
(Continued)

(52) U.S. Cl.
CPC .............. *F21V 17/06* (2013.01); *B29C 65/48* (2013.01); *F21V 1/12* (2013.01); *F21V 1/22* (2013.01);
(Continued)

(58) Field of Classification Search
CPC . F21V 17/06; F21V 1/12; F21V 3/049; B29C 65/48; B29L 2031/34
See application file for complete search history.

(56) References Cited

U.S. PATENT DOCUMENTS 3,385,963 A * 5/1968 Washick ................... F21V 1/26
362/357
4,799,526 A * 1/1989 Reeves ................. B29C 53/043
160/168.1 R
(Continued)

FOREIGN PATENT DOCUMENTS

JP     2003217332     7/2003
JP     2011159472     8/2011
(Continued)

OTHER PUBLICATIONS

International Search Report and Written Opinion for PCT/US2013/070236 mailed Mar. 11, 2014.

*Primary Examiner* — Andrew Coughlin
*Assistant Examiner* — Meghan Ulanday
(74) *Attorney, Agent, or Firm* — Workman Nydegger

(57) ABSTRACT

Implementations of the present invention relate to systems, methods, and apparatus for providing illumination. Particularly, at least one implementation includes a light-weight lighting fixture that can enclose one or more lighting elements and can provide a desired illumination. Furthermore, the light-weight lighting fixture can have no visible hardware connecting various components and/or portions thereof.

40 Claims, 8 Drawing Sheets

(51) Int. Cl.

| | | |
|---|---|---|
| *F21V 1/22* | (2006.01) | |
| *F21V 1/26* | (2006.01) | |
| *B29C 65/48* | (2006.01) | |
| *F21V 1/12* | (2006.01) | |
| *F21V 3/04* | (2006.01) | |
| *F21S 8/06* | (2006.01) | |
| *F21V 17/00* | (2006.01) | |
| *B29L 31/34* | (2006.01) | |

(52) U.S. Cl.
CPC ............... *F21V 1/26* (2013.01); *F21V 3/049* (2013.01); *B29L 2031/34* (2013.01); *F21S 8/061* (2013.01); *F21V 17/007* (2013.01)

(56) References Cited

U.S. PATENT DOCUMENTS

| | | | | |
|---|---|---|---|---|
| 5,702,180 A * | 12/1997 | Huang | ................... | F21S 6/002 |
| | | | | 362/410 |
| 6,302,566 B1 * | 10/2001 | Cohon | ................... | F21V 1/04 |
| | | | | 362/351 |
| 7,504,159 B1 * | 3/2009 | Suare | ................... | B27D 1/00 |
| | | | | 427/213.31 |
| 2010/0149791 A1 | 6/2010 | Mccane | | |
| 2014/0153257 A1 * | 6/2014 | Smith | ................... | F21V 21/00 |
| | | | | 362/355 |

FOREIGN PATENT DOCUMENTS

| | | |
|---|---|---|
| KR | 2020100007653 | 7/2010 |
| KR | 2020120007760 | 11/2012 |

\* cited by examiner

LIGHT-WEIGHT LIGHTING FIXTURE

CROSS-REFERENCE TO RELATED APPLICATIONS

The present invention is a 35 U.S.C. §371 U.S. National Stage of PCT Application No. PCT/US2013/070236 filed Nov. 15, 2013 entitled "Light-Weight Lighting Fixture," which claims the benefit of priority to U.S. Provisional Application No. 61/728,461, filed Nov. 20, 2012, entitled "Light-Weight Lighting Fixture." The entire contents of the aforementioned patent applications is incorporated by reference herein.

BACKGROUND OF THE INVENTION

1. The Field of the Invention

This invention relates to systems, methods, and apparatus for providing illumination.

2. Background and Relevant Art

Recent trends in building design involve using one or more sets of decorative panels to add to the functional and/or aesthetic characteristics of a given structure or design space. These recent trends are due, at least in part, to the increased flexibility with how a given panel (or set of panels) can be designed, compared with the original structure. For example, recent panel materials include synthetic, polymeric resin materials, which can be formed as panels to be used as partitions, walls, barriers, treatments, décor, etc.

In particular, the use of resin materials is becoming increasingly popular in sculptural and lighting applications. In general, resin materials such as these are now popular compared with decorative cast or laminated glass materials because resin materials may be manufactured to be more resilient and to have a similar transparent, translucent, or decorative appearance as cast or laminated glass, but with less cost. In addition, resin materials tend to be more flexible in terms of manufacture and assembly because they can be relatively easily bent, molded, colored, shaped, cut, and otherwise modified in a variety of different ways. Moreover, resin materials can be either hot or cold-molded. Decorative resins can also provide more flexibility compared with glass and other conventional materials at least in terms of color, degree of texture, gauge, and impact resistance. Additionally, decorative resins have a fairly wide utility since they may be formed to include a large variety of colors, images, interlayers, and shapes.

Unfortunately, some lighting fixtures made with resin materials are designed to allow for quick, efficient, and inexpensive production. The design of such resin-based lighting fixtures may not focus on, or even allow for, full utilization of the aesthetics that resin-based materials can provide. In some instances, resin-based lighting fixtures are designed for mass production. Mass produced resin-based lighting fixtures, while being relatively inexpensive, can lack uniqueness. In other instances, resin-based lighting fixtures can be too unique. Often, resin-based lighting fixtures that are too unique cannot be mass produced on any appreciable level without making such unique lighting fixtures costly.

Furthermore, some lighting fixtures made with resin materials require numerous hardware components and/or complicated hardware and installation procedures. Such hardware can be visible and unsightly. The undesirable aesthetic of hardware is often magnified when using translucent resin lighting fixtures. Indeed, the mounting hardware of some conventional resin-based lighting fixtures may be unappealing to designers and architects seeking to obtain a certain aesthetic by using resin-based products.

In addition to the foregoing, hardware often adds significant weight and/or cost to lighting fixtures. The added weight due to hardware often can limit the spaces in which heavier lighting fixtures may be used. For example, suspended ceilings and other spaces may not adequately support heavy lighting fixtures. Further, assembling lighting fixtures with multiple pieces of hardware may require two assemblers.

Accordingly, there are a number of disadvantages in resin-based lighting fixtures that can be addressed.

BRIEF SUMMARY OF THE INVENTION

Implementations of the present invention solve one or more of the foregoing or other problems in the art with resin-based lighting fixtures that help magnify the aesthetic features of resin-based materials included therein. For example, one or more implementations of the present invention include resin-based lighting fixtures that reduce or eliminate the visibility and/or use of hardware. Additionally, one or more implementations include a method of forming resin-based lighting fixtures that allows the resin-based lighting fixture to be unique, aesthetically pleasing, and yet cost effective. Furthermore, one or more implementations include light-weight light fixtures.

For instance, in one implementation, a lighting fixture includes one or more side panels coupled together, thereby forming an outer shade element. The lighting fixture also includes a bottom panel coupled to the outer shade element. In some implementations, the one or more side panels are coupled together without hardware. Likewise, in some implementations the bottom panel is coupled to the outer shade element without hardware.

In another implementation, a lighting fixture includes one or more side panels coupled together without hardware, thereby forming an outer shade element. The lighting fixture also includes one or more side panels coupled together without hardware, thereby forming an inner shade element. The inner shade element forms a cavity with a passageway therethrough. A bottom panel is coupled to the outer shade element and the inner shade element without hardware. Similarly, a top panel is coupled to the outer shade element and the inner shade element without hardware.

In yet another implementation, a method for manufacturing a light-weight lighting fixture includes forming an outer shade element by coupling together a plurality of side panels using a solvent. The method can also include coupling a bottom panel to the outer shade element, such as with a solvent. Further, the method can include coupling a top panel to the outer shade element, such as with a solvent.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific implementations thereof which are illustrated in the appended drawings. For better understanding, like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention provide resin-based lighting fixtures that help magnify the aesthetic features of resin-based materials included therein. For example, one or more implementations of the present invention include resin-based lighting fixtures that reduce or eliminate the visibility and/or use of hardware. Additionally, one or more implementations include methods of forming resin-based lighting fixtures that allow for the production of unique, aesthetically pleasing, and yet cost effective resin-based lighting fixtures. Furthermore, one or more implementations include light-weight light fixtures.

In one or more implementations, the light-weight lighting fixture can have a modular configuration. For instance, the light-weight lighting fixture can comprise one or more flexible panels that can be cold-formed (e.g., without heating) into a desired shape during assembly of the light-weight lighting fixture. Moreover, such flexible panels can combine together to form various three-dimensional shapes, as may be desired by an assembler or installer. For example, multiple flexible panels can couple together to form a substantially cylindrical shape. Likewise, flexible panels can couple together to form rectangular or other shapes.

Additionally or alternatively, modularity of the light-weight lighting fixture can facilitate just-in-time manufacturing. In other words, a manufacturer can assemble the light-weight lighting fixture after receiving an order or making a sale. Consequently, in lieu of storing fully assembled light-weight lighting fixtures, the manufacturer can store more portable components thereof (e.g., flexible panels), which can occupy less storage space and can be easily assembled into light-weight lighting fixtures of various shapes on demand.

Figure 1A:
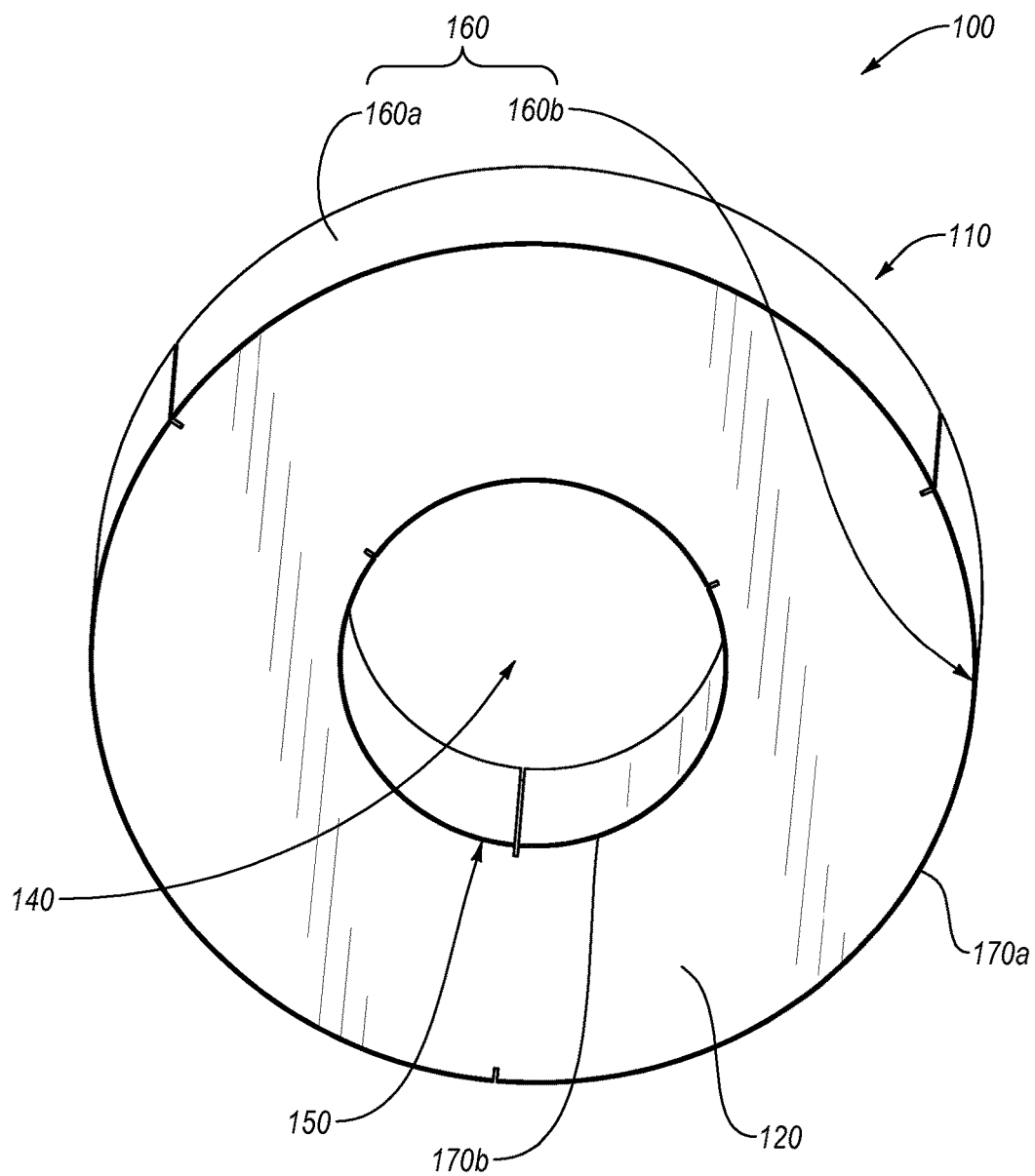
FIG. 1A illustrates a bottom perspective view of a lighting fixture in accordance with one implementation of the present invention.
Figure 1B:
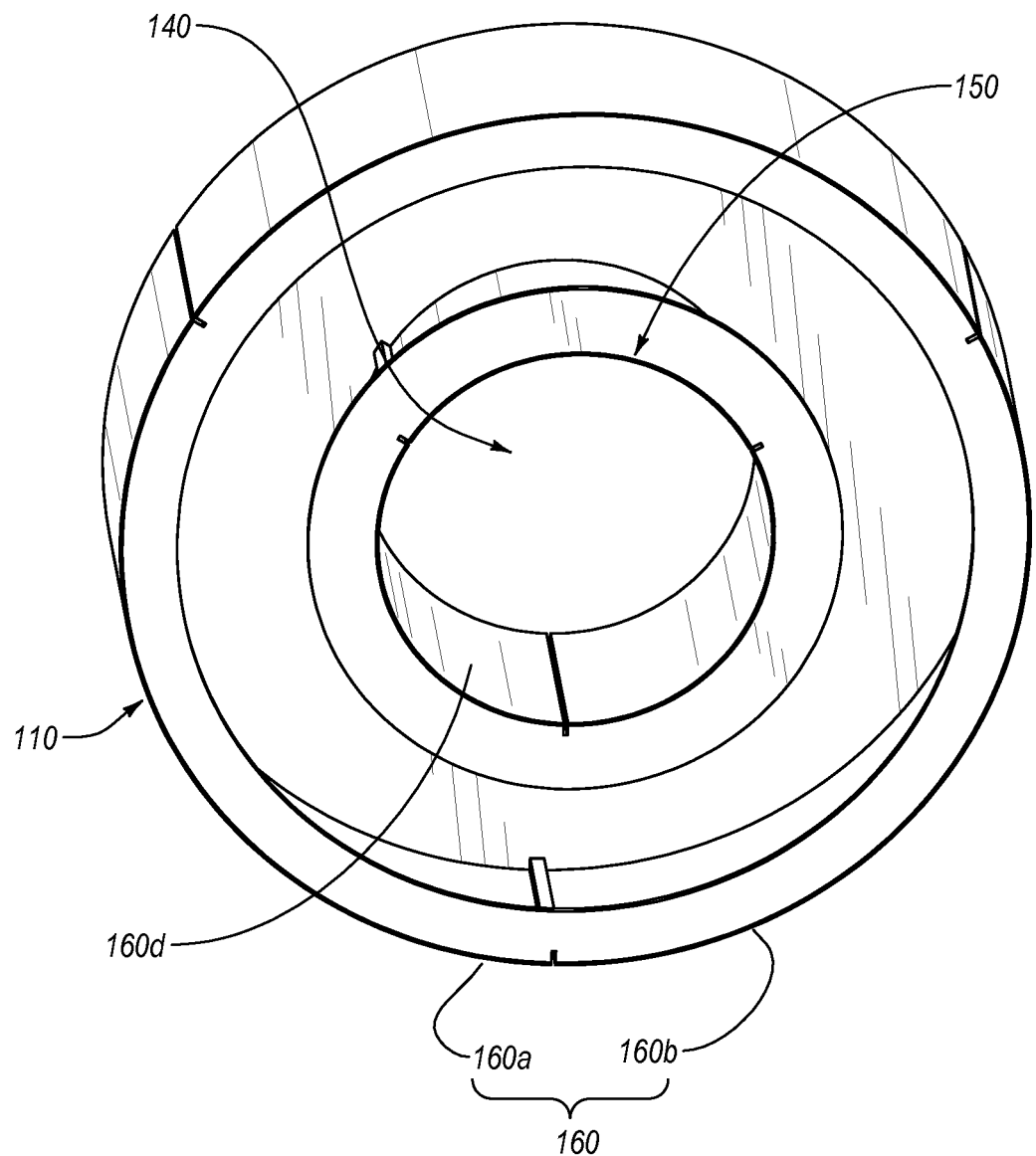
FIG. 1B illustrates a top perspective view of the lighting fixture of FIG. 1A.
Figure 1C:
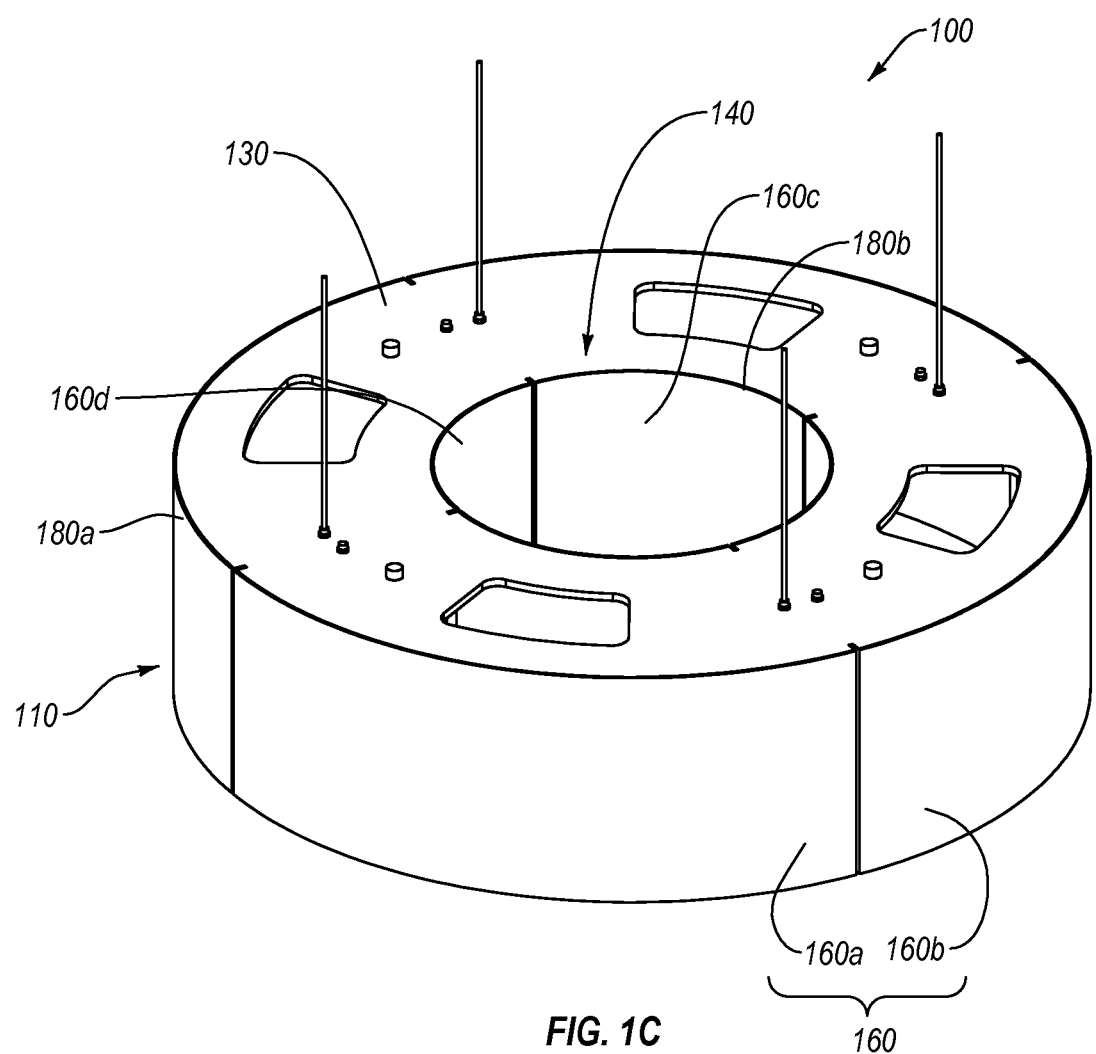
FIG. 1C illustrates a top perspective view of the lighting figure of FIG. 1A with an installed top panel.

Referring now to the Figures, FIGS. 1A-1C illustrate one implementation of the present invention. Particularly, FIGS. 1A-1C illustrate a light-weight lighting fixture 100 that has an outer element or shade 110. Additionally, the light-weight lighting fixture 100 can have a bottom panel 120 (FIG. 1A) coupled to the outer element or shade 110. The outer element or shade 110 and the bottom panel 120 can conceal one or more lighting components within the light-weight lighting fixture 100. In at least one implementation, the outer element or shade 110 can have a substantially cylindrical shape. However, it will be appreciated that the outer element or shade 110 can be of any shape or configuration.

The light-weight lighting fixture 100 also can have a top panel 130 (FIG. 1C) that can couple to the outer element or shade 110. The top panel 130 can provide additional rigidity to the light-weight lighting fixture 100 and can further enclose the lighting elements. As further described below, the top panel 130 also can facilitate attachment of various mounting features and elements, which can allow an installer to secure the light-weight lighting fixture 100 to a support surface.

In at least one implementation, the top panel 130 and/or bottom panel 120 can diffuse the light emitted by lighting elements, as the light passes through the top panel 130 and/or bottom panel 120. For example, the top panel 130 and/or bottom panel 120 can comprise a single panel or sheet of translucent material (e.g., thermoplastic, glass, etc.). Particularly, the top panel 130 and/or the bottom panel 120 can have a background layer or coating that can diffuse the light as the light passes therethrough.

Thus, for instance, the top panel 130 and/or the bottom panel 120 can be a thermoplastic sheet, such as acrylic (e.g., PMMA), PETG, PC or another polymer. Additionally, the top panel 130 and/or the bottom panel 120 can optionally include a background layer. The background layer can comprise a translucent film, a translucent paint, or other coating which can be applied to the front and/or back surfaces of the top panel 130 and/or the bottom panel 120. Additionally or alternatively, the top panel 130 and/or the bottom panel 120 can have a surface roughness or other features that can deflect and diffuse the light emitted by the lighting elements. Thus, top panel 130 and/or the bottom panel 120 can act as diffusors to help evenly distribute light.

As shown by FIGS. 1A-1C, in one or more implementations the light-weight lighting fixture 100 also can have a cavity therein or a passageway therethrough. For instance, the light-weight lighting fixture 100 can have a passageway 140 defined by an inner shade element 150. The passageway 140 can provide a pleasing aesthetic to the viewer. Additionally or alternatively, the passageway 140 can facilitate mounting of the light-weight lighting fixture 100 to a support surface.

It should be appreciated that the passageway 140 can have various shapes and configurations, which can vary from one implementation to another. Consequently, a particular inner shade element 150 that defines the passageway 140 also can vary from one implementation to another. For example, in one implementation, the inner shade element 150 can have a substantially cylindrical shape.

As mentioned above, the light-weight lighting fixture 100 can have a modular configuration, which, for instance, can allow the manufacturer to assemble the light-weight lighting fixture 100 in a just-in-time manner. More specifically, the outer element or shade 110 can comprise side panels 160, such as side panels 160*a*, 160*b*, coupled together. Similarly, the inner shade element 150 can comprise multiple side panels 160, such as side panels 160*c*, 160*d*, which can couple together to form the inner shade element 150. The side panels 160 can comprise a thermoplastic material in one or more implementations. Alternatively, the side panels 160 also can comprise sheet metal, such as aluminum, steel, copper, and other similar metals. It should be appreciated that the side panels 160 can be made of any material that can couple together as described herein.

More specifically, the side panels 160 can comprise thin sheets of a thermoplastic material (e.g., PETG, PMMA, and PC). For example, in one implementation the side panels 160 comprise 1/16" PETG sheets. The thin gauge of the side panels 160 can allow light to pass therethrough, can allow for cold or other forming, and can reduce the weight of the lighting fixture 100. In alternative implementations, the side panels 160 can have a thickness greater than about 1/16", such as about 1/8" or 1/4". In still further implementations, the side panels 160 can have a thickness less than about 1/16", such as about 1/32". It should be appreciated that the side panels 160 can be made of the various thicknesses described herein and other thicknesses as desired.

Additionally, the bottom panel 120, top panel 130, and/or side panels 160 can be translucent and can at least partially diffuse the light emitted by the lighting elements. In at least one implementation, the side panels 160 can have different translucency, shading, and/or color than the bottom panel 120 and/or the top panel 130. Accordingly, for example, the light-weight lighting fixture 100 can transmit more light through the bottom panel 120 and/or top panel 130 than through the side panels 160. Conversely, the light-weight lighting fixture 100 can transmit more light through the side panels 160 than through the bottom panel 120 and/or top panel 130. Thus, the assembler or designer can choose a particular direction for the light exiting the light-weight lighting fixture 100.

In addition to the foregoing, the inner shade surface of the side panels 160 can optionally include a diffusion layer. The diffuser layer (or diffusion surface finish) can further assist in evenly distributing the light uniformly across the side panels 160 and throughout interior space of the lighting fixture 100. For example, the side panels 160 can include a thin white translucent layer on the inner shade surface. A manufacturer/designer can use the white translucent layer (also known as a "Ghost" layer) to increase the reflective properties of the inner shade surface of the side panels 160, while at the same time allowing light to pass through the side panels 160. The white translucent layer can also be added to bottom panel 120 and/or top panel 130 and can have a thickness of about one millimeter (1 mm).

In addition to the light diffusion characteristics discussed above, the light fixture includes one or more light sources that a manufacturer/designer can configure and position to provide a light source that allows for uniform distribution of light across all panels and throughout the lighting fixture. A manufacturer/designer can choose the type, location, and configuration of the light source depending on the size and configuration of the lighting fixture. For example, the type of light source can vary from one implementation to the next, as well as within the same implementation. Example types of light sources can include, but are not limited to, fluorescent light bulbs, incandescent light bulbs, and LEDs. LEDs in particular can vary from one implementation to the next, depending on the overall size and configuration of the lighting fixture. For example, LEDs used in connection with implementations of the present invention can include LED strips, tape, boards, or other LED configurations.

Also, as described above, the side panels 160 can couple together to form a three-dimensional shape such as the outer element or shade 110 and/or the inner shade element 150. In light of this disclosure, those skilled in the art should appreciate that any two or more of the side panels 160 can have the same or similar size (e.g., width, height, and/or thickness). Accordingly, the side panels 160 that form the outer element or shade 110 can have the same size as the side panels 160 that form the inner shade element 150. Thus, the manufacturer can simplify storage and/or production of the side panels 160, which may lead to reduction in manufacturing costs of the light-weight lighting fixture 100.

In at least one implementation, the manufacturer can cold form (i.e., elastically deform) the side panels 160 into a desired shape. For instance, the side panels 160 can be sufficiently rigid and/or flexible to allow such bending without heating. Particularly, the manufacturer can bend the side panels 160 into a substantially cylindrical shape, such as the outer element or shade 110 and/or the inner shade element 150.

Moreover, as described above, the manufacturer can elastically bend the side panels 160 into desired shapes, after coupling the side panels 160 together, to form inner shade and/or outer elements. Such inner shade and/or outer elements can be sufficiently flexible to allow further elastic and/or plastic deformation and conforming to the corresponding profiles of the top and/or bottom panels. In other words, the manufacturer can further bend the side panels 160 after assembling the side panels 160 together into inner shade or outer elements.

Alternatively, however, the manufacturer can plastically deform the side panels 160 before, during, and/or after coupling the side panels 160 together to form the inner shade or outer elements. For example, the manufacturer can pre-bend the side panels 160, by plastically deforming the side panels 160 into desired shapes. The manufacturer also can heat and bend the side panels 160 into desired shapes and subsequently cool the side panels 160. After bending the side panels 160 into the desired shapes, the manufacturer can assemble the inner shade and/or outer elements by coupling the side panels 160 together.

Referring now to FIGS. 1A and 1C, as noted above, the bottom panel 120 and the top panel 130 can couple to the outer element or shade 110, the inner shade element 150, and/or a combination thereof. Thus, the bottom panel 120 and/or the top panel 130 can at least in part define the shapes of the outer element or shade 110 and/or inner shade element 150. For example, the bottom panel 120 and the top panel 130 can have substantially the same shapes and profiles that couple to the outer element or shade 110 and/or the inner shade element 150.

More specifically, as shown in FIG. 1A, the bottom panel 120 can have a substantially circular outer profile 170*a* and a substantially circular inner shade profile 170*b*. Similarly, as shown in FIG. 1C, the top panel 130 can have a substantially circular outer profile 180*a* and a substantially circular inner shade profile 180*b*. Consequently, when coupled to the bottom panel 120 and top panel 130, the side panels 160 can form substantially cylindrical outer and inner shade elements 110, 150.

It should be noted, however, that the inner shade and/or outer profiles 170*a*, 170*b*, 180*a*, 180*b* of the bottom and top panels 120, 130, respectively, can vary from one implementation to another. For example, the outer profile 180*a* of the top panel 130 can be larger than the outer profile 170*a* of the bottom panel 120. Accordingly, when coupled to the bottom panel 120 and/or top panel 130, the side panels 160 can form an outer element or shade 110 with a conical shape (tapering downward from the top panel 130 toward the bottom panel 120). Moreover, the bottom panel 120 and/or the top panel 130 can have essentially any suitable shape that can allow the manufacturer to couple the side panels 160 to the bottom panel 120 and/or to the top panel 130 in a manner that shapes the outer element or shade 110 and/or the inner shade element 150.

Figure 2:
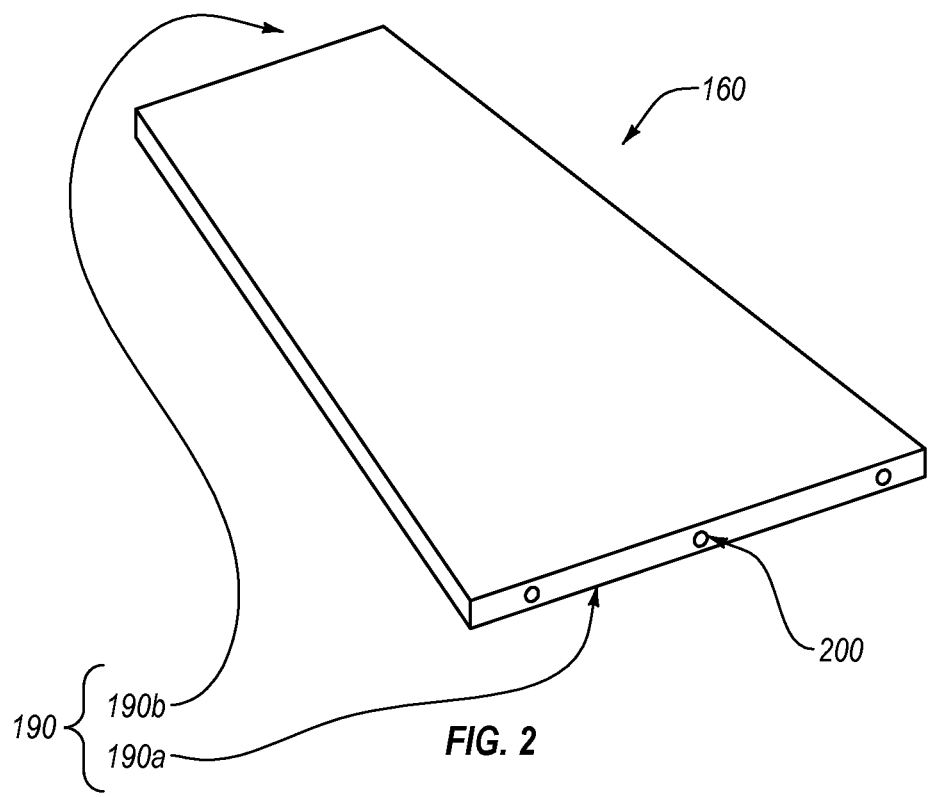
FIG. 2 illustrates a perspective view of a side panel of a lighting fixture in accordance with one implementation of the present invention.

As mentioned above, the side panels 160 can couple together, thereby forming the outer element or shade 110 and/or inner shade element 150, while the bottom panel 120 and/or top panel 130 can further define the shapes of the outer element or shade 110 and inner shade element 150. In one implementation, the side panels 160 can have opposing flanges that can couple one side panel 160 to another side panel 160. For example, as illustrated in FIG. 2, the side panels 160 can have opposing flanges 190 (such as flanges 190*a*, 190*b*). To form the flanges, a manufacturer can score a line along the inner shade surface of a side panel 160 and then cold form the flange by bending the side panel 160 along the score.

Figure 3:
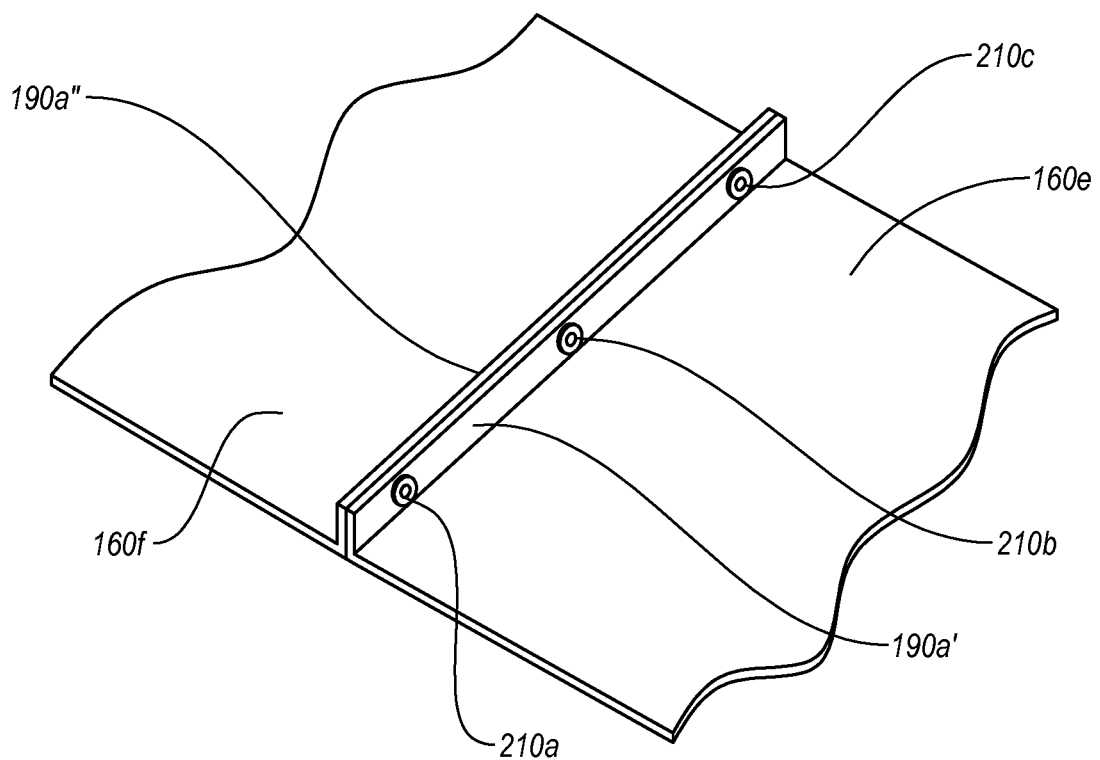
FIG. 3 illustrates a perspective view of two side panels of FIG. 2 coupled together.

The flanges 190 can have one or more perforations 200, which can allow the manufacturer to permanently or temporarily couple the side panels 160 together (e.g., with one or more corresponding fasteners, such as screws, nut and bolt combinations, rivets). For instance, as illustrated in FIG. 3, a flange 190*a*' of side panel 160*e* can couple to a flange 190*a*" of a side panel 160*f*. More specifically, fasteners 210*a*, 210*b*, 210*c* can pass through perforation in the respective flanges 190*a*', 190*a*", thereby coupling the side panel 160*e* to the side panel 160*f*.

Figure 4A:
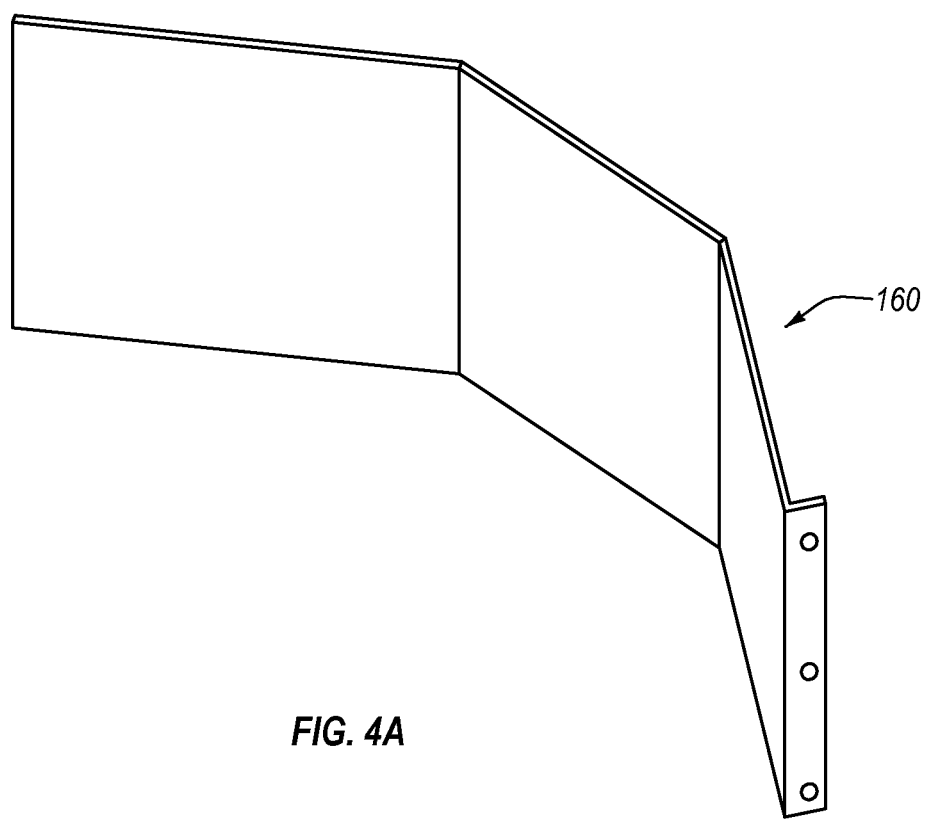
FIG. 4A illustrates a perspective view of three side panels coupled together in accordance with one implementation of the present invention.
Figure 4B:
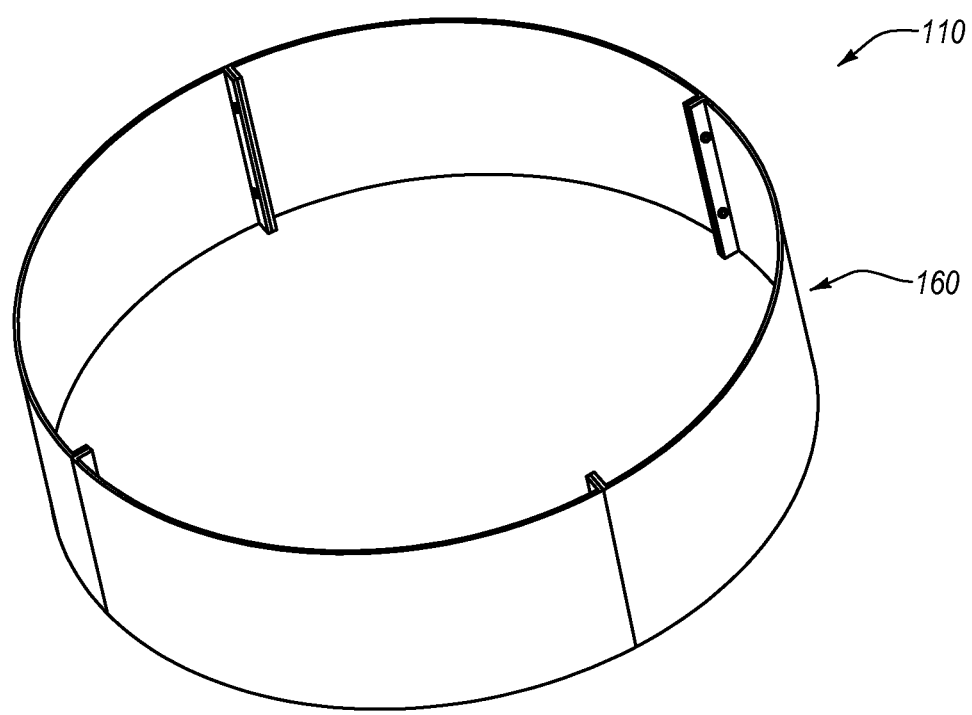
FIG. 4B illustrates a perspective view of an outer shade element of a lighting fixture in accordance with one implementation of the present invention.

As illustrated in FIG. 4A, the side panels 160 (and their corresponding flanges) can bend in a manner that forms an inner shade element. In other words, the flanges of the side panels 160 can face outward, while outer surfaces of the side panels 160 can face inward. Alternatively, however, as illustrated in FIG. 4B, the outer surfaces of the side panels 160 can face outward, while the corresponding flanges can face inward, thereby forming the outer element or shade 110.

In at least one implementation, an adhesive or a solvent can couple one or more of the flanges of the side panels 160 together. For example, the manufacturer can solvent weld the flanges together using WELD-ON for acrylics or another suitable solvent. Optionally, the manufacturer can temporarily secure the flanges of the side panels 160 together with fasteners, as described above. Subsequently, the manufacturer can inject a welding solvent (e.g., a solvent that can partially dissolve thermoplastic flanges, thereby bonding the flanges together after solidification). After the flanges are coupled or bonded together, the manufacturer can remove the fasteners from the flanges. In still further implementations, the manufacturer can use a combination of adhesive and solvent bonding to secure the flanges together. In any event, in one or more implementations the manufacturer can couple side panels 160 together to from outer and inner shade elements without any hardware.

Figure 5:
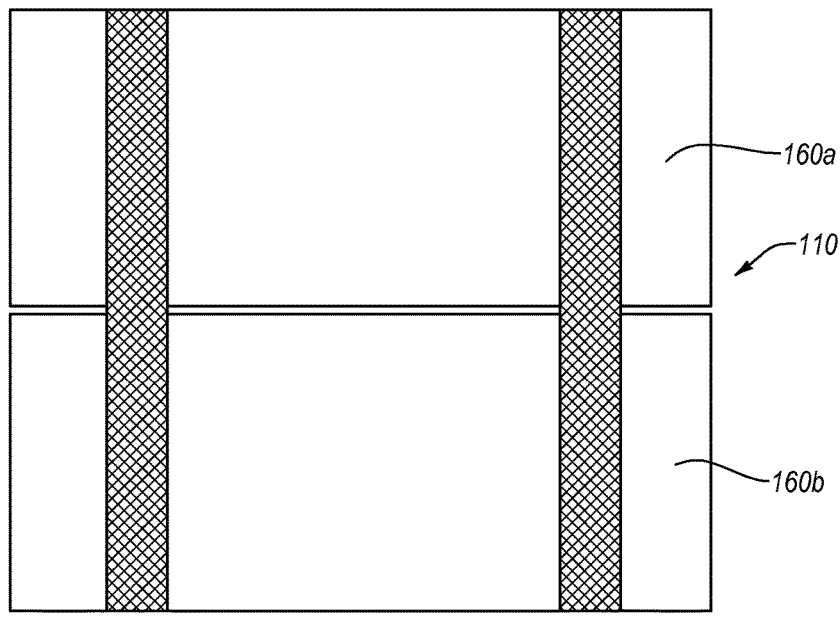
FIG. 5 illustrates a side view of an illuminated outer shade element of a light-weight lighting fixture in accordance with one implementation of the present invention.

As mentioned above, absence of hardware within the light-weight lighting fixture can provide a pleasing aesthetic. For instance, as illustrated in FIG. 5, the outer element or shade 110 can have side panels 160*a*, 160*b* coupled together without any hardware. Notably, such coupling eliminates hardware that otherwise can be visible to the viewer.

The top panel 130 and/or bottom panel 120 can couple to the outer element 110 and/or inner shade element 150 in the same or similar manner as described above in connection with the flanges of the side panels 160. More specifically, the manufacturer can bond the top panel 130 and/or bottom panel 120 to the outer element 110 and/or inner shade element 150 of the light-weight lighting fixture. For example, the manufacturer can use an adhesive, solvent, or a combination thereof. Consequently, similar to the side panels 160, the manufacturer can avoid using any hardware in the connections between the top panel 130 and bottom panel 120 and the outer element 110 and/or inner shade element 150. Hence, the viewer may see no hardware components within the light-weight lighting fixture.

In one or more implementations, the top panel 130 and/or bottom panel 120 can have a slot that at least partially follows the outer element 110 and/or inner shade element 150 profiles thereof. Thus, the side panels 160 that form the outer element 110 and/or inner shade element 150 can fit into such slot. Similarly, the side panels 160 that form the outer element 110 and/or inner shade element 150 can abut the slot on the top panel 130 and/or bottom panel 120. Accordingly, the manufacturer can locate the outer element 110 and/or inner shade element 150 relative to the top panel 130 and/or bottom panel 120 at predetermined positions. For instance, the top panel 130 and/or bottom panel 120 can couple to the outer element 110 such that the outside surface of the outer element 110 is flush with the outer profile of the top panel 130 and/or bottom panel 120.

It should be appreciated, however, that the particular relationship between the top panel 130 and/or bottom panel 120 and the outer element 110 and/or inner shade element 150 can vary from one implementation to the other. Accordingly, in at least one implementation, at least a portion of the top panel 130 and/or bottom panel 120 can protrude past the outer element 110. In any event, the light-weight lighting fixture can have an outer element secured to the top panel 130 and/or bottom panel 120, thereby concealing a light source.

Additionally, the top panel 130 and/or bottom panel 120 can include a groove that at least partially follows the outer element 110 and/or inner shade element 150 profiles thereof. The groove can act as a guide or pathway for placing solvent, adhesive, or glue.

One will appreciate in light of the disclosure herein that solvent welding can provide a significant advantage over other connection attachment methods. For example, some glue and other adhesives can leave visible traces that are un-aesthetically pleasing, particularly when the lighting fixture is lit. Furthermore, hardware can also have un-appealing aesthetic effects. Solvent welding on the other hand can provide a strong bond, while leaving no visible effects.

One or more implementations of the present invention can use an adhesive to bond side panels 160 to top panel 130 and/or bottom panel 120, while avoiding some or all un-aesthetically pleasing visible traces of the adhesive. For example, the manufacturer can use latex gloves or other techniques to prevent contamination or blooming of the adhesive.

In one or more implementations, the adhesive used to bond the side panels 160 to top panel 130 and/or bottom panel 120 can comprise a cyanoacrylate instant adhesive. More particularly, the adhesive can also optionally comprise a low viscosity adhesive. Low viscosity adhesives can allow a manufacturer to apply the adhesive between the side panels 160 and top panel 130 and/or bottom panel 120 using a capillary action. For example, the manufacturer can abut the side panels 160 against the top panel 130 and/or bottom panel 120 and then apply the low viscosity adhesive to the interface/seam of the side panels 160 and the top panel 130 and/or bottom panel 120 using a needle or other delivery mechanism. The low viscosity adhesive or a self-wicking adhesive can then flow between the side panels 160 and top panel 130 and/or bottom panel 120 using a capillary action. The adhesive can then bond the side panels 160 and top panel 130 and/or bottom panel 120 together.

Figure 6:
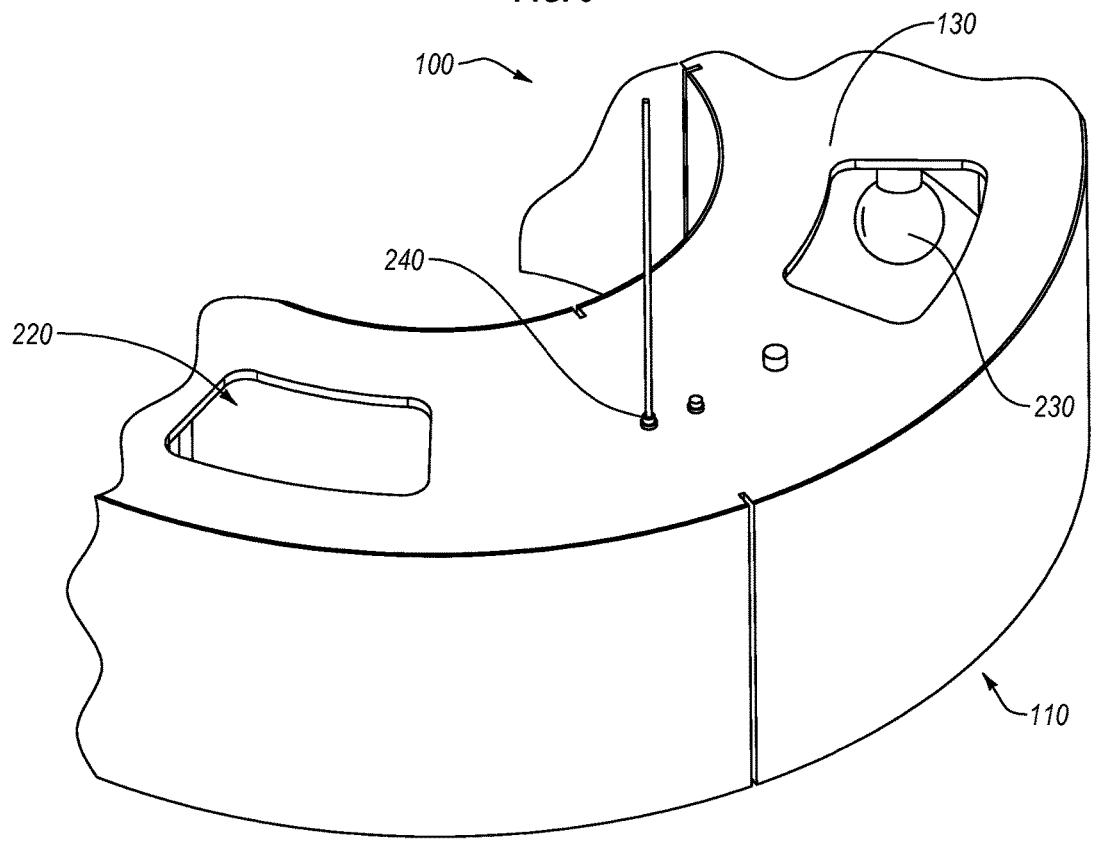
FIG. 6 illustrates a partial perspective view of a top panel of a lighting fixture in accordance with one implementation of the present invention.

As noted above, the light-weight lighting fixture 100 can incorporate a single or multiple lighting elements. For example, as illustrated in FIG. 6, the light-weight lighting fixture 100 can have a top panel 130 that has multiple openings 220, which can provide access to lighting elements 230 (e.g., incandescent light bulbs, cfl bulbs, LEDs, string lights) located within the outer element or shade 110. The manufacturer or user can secure or change the lighting elements 230 during the assembly of the light-weight lighting fixture 100 as well as after the deployment thereof into service. In at least one implementation, the top panel 130 also can include removable covers that can selectively close the openings 220.

Additionally, mounting elements 240 can couple to the top panel 130. In one or more implementations, the mounting elements 240 can comprise one or more cables that can secure the light-weight lighting fixture 100 to the support surface, such as a ceiling. Alternatively, the mounting elements 240 can be substantially rigid, which, for example, can allow the installer to secure the light-weight lighting fixture 100 to a vertical support surface. In any event, the mounting elements 240 can have a desired rigidity and flexibility, which can vary from one implementation to another, and which can allow the installer to secure the light-weight lighting fixture 100 to a desired support surface.

Figure 7:
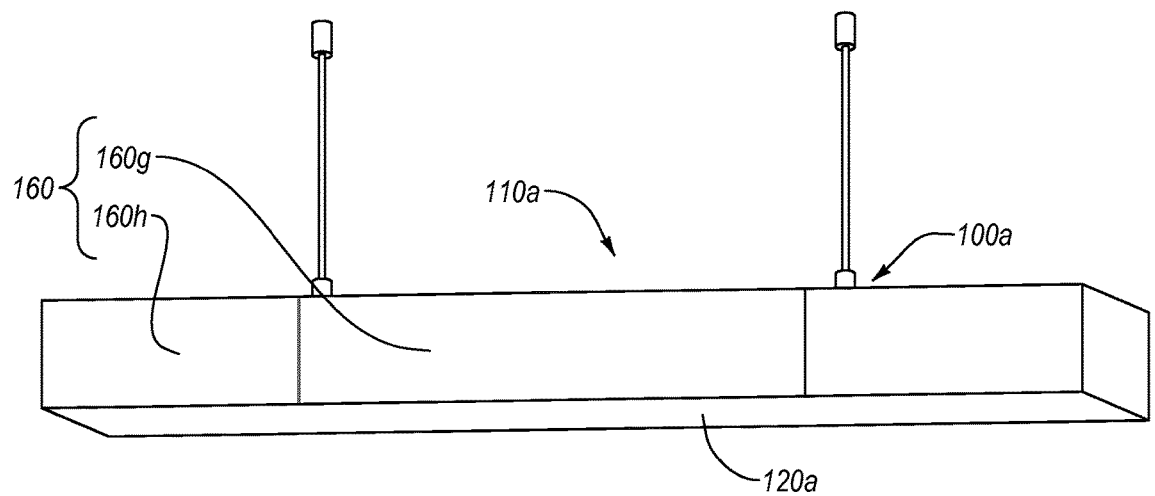
FIG. 7 illustrates a perspective view of lighting fixture in accordance with another implementation of the present invention.

As mentioned above, the particular shape of the light-weight lighting fixture 100 can vary and may depend on the particular space or area to be illuminated, architectural and/or aesthetic preferences, as well as other aesthetic and practical considerations. For instance, as illustrated in FIG. 7, a light-weight lighting fixture 100a can have a substantially rectangular or a beam-like shape. Except as otherwise described herein, the light-weight lighting fixture 100a can be substantially the same as the light-weight lighting fixture 100 (FIGS. 1A-1C).

For instance, the light-weight lighting fixture 100a can include an outer element or shade 110a that can have a substantially rectangular shape. Likewise, a bottom panel 120a can have a substantially rectangular outer profile. Hence, the bottom panel 120a can couple to the outer element or shade 110a and can at least in part define the shape of the light-weight lighting fixture 100a.

The manufacturer can form the outer element or shade 110a from multiple side panels 160 (e.g., side panel 160g, side panel 160h). The side panels 160 used for the outer element or shade 110a can be substantially the same as the side panels 160 used in the outer element or shade 110 (FIGS. 1A-1C). Similarly, the manufacturer can cold form the side panel 160g to form a corner of the outer element or shade 110a using a scored line as described above.

Figure 8:
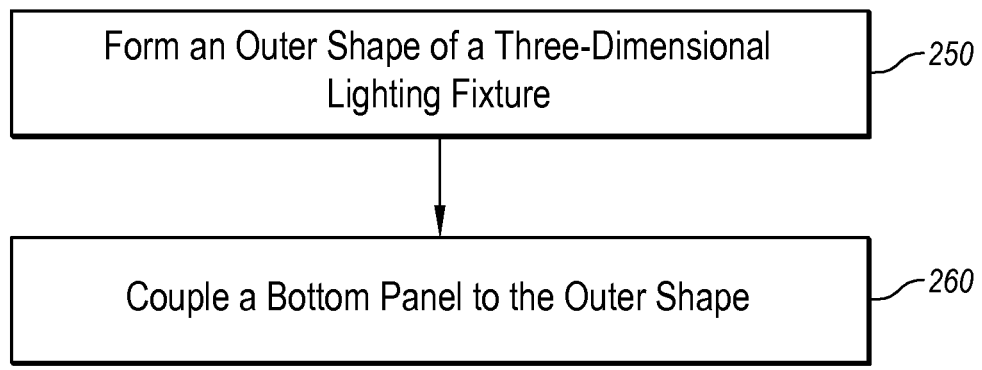
FIG. 8 illustrates a flowchart of a method of manufacturing a lighting fixture in accordance with one implementation of the present invention.

Accordingly, FIGS. 1-7, and the corresponding text, provide a number of different components and mechanisms for manufacturing a light-weight lighting fixture. In addition to the foregoing, implementations of the present invention also can be described in terms one or more acts in a method for accomplishing a particular result. For example, FIG. 8 illustrates a flowchart of one exemplary method for manufacturing the light-weight lighting fixture 100, 100a (FIGS. 1-7). The acts of FIG. 8 are described below with reference to the components of FIGS. 1 through 7.

For example, FIG. 8 shows that the method of manufacturing the light-weight lighting fixture 100, 100a can include an act 250 of forming outer elements, such as the outer element or shade 110, 110a. More specifically, the manufacturer can couple the side panels 160 together, thereby forming the outer element or shade 110, 110a. For instance, the manufacturer can couple the flanges of the side panels 160 with one or more fasteners. Subsequently, the manufacturer can weld (e.g., with a welding solvent, ultrasonic welder, etc.) or glue the flanges of the side panels 160 together. The fastener can help ensure that the side panels 160 remain in predetermined positions relative to one another during the welding or gluing thereof. After welding and/or gluing the flanges together, the manufacturer can remove the fasteners from the flanges of the side panels 160.

The method also can include an act 260 of coupling the bottom panel 120, 120a to the outer element or shade 110, 110a. For example, the manufacturer can weld or fasten the bottom panel 120, 120a to the outer element or shade 110, 110a. As noted above, the bottom panel 120, 120a can at least in part define the shape of the outer element or shade 110, 110a.

Likewise, the method can include coupling the top panel 130 to the outer element or shade 110. Furthermore, the method can include installing one or more lighting elements 230 in the light-weight lighting fixture 100, 100a. In one or more implementations, the method includes securing one or more mounting elements 240 to the light-weight lighting fixture 100 (e.g., to the top panel 130).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A lighting fixture, comprising:
   one or more side panels comprising one or more thermoplastic sheets welded together without hardware at corresponding flanges bent inward from an outer surface of the one or more panels, such that the welded one or more thermoplastic sheets form an outer shade element;
   one or more side panels comprising one or more thermoplastic sheets welded together without hardware at corresponding flanges bent inward from an outer surface of the one or more panels, such that the welded one or more thermoplastic sheets form an inner shade element;
   the inner shade element forming a cavity with a passageway therethrough;
   a bottom panel coupled to the outer shade element and the inner shade element without hardware; and
   a top panel coupled to the outer shade element and the inner shade element without hardware;

wherein:
the one or more side panels include a diffusion layer; and
the lighting fixture includes one or more light sources.

2. The lighting fixture as recited in claim 1, wherein the one or more side panels of the outer shade element have a thickness greater than about 1/16".

3. The lighting fixture as recited in claim 1, wherein the one or more side panels of the inner shade element have a thickness less than about 1/16".

4. The lighting fixture as recited in claim 1, wherein:
the corresponding flanges comprise solvent weld points that couple the corresponding flanges of the one or more thermoplastic sheets together; and
the weld points indicate points at which the flanges have partially dissolved and solidified.

5. The lighting fixture as recited in claim 4, wherein the bottom panel and top panel each comprises a thermoplastic sheet that is solvent welded to the outer shade element.

6. The lighting fixture as recited in claim 1, wherein the outer shade element comprises one or more corners formed therein.

7. The lighting fixture as recited in claim 6, wherein the outer shade element comprises a substantially square or rectangular shape.

8. The lighting fixture as recited in claim 1, wherein the outer shade element comprises a substantially cylindrical shape.

9. The lighting fixture as recited in claim 1, wherein:
at least one of the panels forming the outer shade element, inner shade element, bottom panel, or top panel is textured; and
the textured panel comprises a surface roughness that deflects and diffuses light emitted by the one or more light sources.

10. The lighting fixture as recited in claim 1, further comprising:
one or more mounting elements coupled to the lighting fixture;
wherein the one or more mounting elements couple one or more panels selected from the outer shade element, the inner shade element, the top panel, and bottom panel of the lighting fixture to a support surface panels a support surface.

11. The lighting fixture as recited in claim 1, wherein the diffusion layer comprises a coating applied to a panel surface.

12. The lighting fixture as recited in claim 11, wherein the coating comprises a translucent paint.

13. The lighting fixture as recited in claim 11, wherein the coating comprises a white translucent film.

14. A lighting fixture, comprising:
a plurality of side panels coupled together without hardware to form an outer shade element, wherein each side panel of the plurality comprises a resin sheet;
a plurality of side panels coupled together without hardware to form an inner shade element, wherein each side panel of the plurality comprises a resin sheet;
the inner shade element forming a cavity with a passageway therethrough;
a resin bottom panel coupled to the outer shade element and the inner shade element without hardware; and
a resin top panel coupled to the outer shade element and the inner shade element without hardware;
wherein:
the plurality of side panels forming the outer shade element are solvent-welded together at one or more flanges;

the plurality of side panels forming the inner shade element are solvent-welded together at one or more flanges; and
the top panel and bottom panels are solvent welded to the inner shade element and outer shade element using a solvent that at least partially dissolves the contacted resin upon contact before solidifying the contacted resin.

15. The lighting fixture as recited in claim 14, wherein:
the top panel and bottom panel have outer profiles; and
wherein the outer profile of the top panel is larger than the outer profile of the bottom panel.

16. The lighting fixture as recited in claim 14, wherein
the top panel has a slot;
the bottom panel has a slot;
the outer element has a profile;
the inner element has a profile;
the profile of the outer element at least partially follows the top panel slot and bottom panel slot; and
the profile of the inner element at least partially follows the top panel slot and bottom panel slot.

17. The lighting fixture as recited in claim 14, wherein
the top panel has a groove;
the bottom panel has a groove.

18. The lighting fixture as recited in claim 14, further comprising:
mounting elements couplable to the top panel.

19. The lighting fixture as recited in claim 14, wherein the side panels are made of a thermoplastic material.

20. The lighting fixture as recited in claim 14, wherein the outer shade element and the inner shade element are cold-formed.

21. The lighting fixture as recited in claim 14, wherein the top panel and the bottom panel are single sheets of translucent material.

22. The lighting fixture as recited in claim 21, wherein the translucent material of the top panel and the bottom panel includes a coating for diffusing light.

23. The lighting fixture as recited in claim 21, wherein the translucent material of the top panel and the bottom panel has a surface roughness.

24. The lighting fixture as recited in claim 14, wherein the plurality of side panels of the outer shade element have a thickness greater than about 1/16".

25. The lighting fixture as recited in claim 14, wherein the plurality of side panels of the inner shade element have a thickness less than about 1/16".

26. The lighting fixture as recited in claim 14, wherein the outer shade element comprises one or more corners formed therein.

27. The lighting fixture as recited in claim 26, wherein the outer shade element comprises a substantially square or rectangular shape.

28. The lighting fixture as recited claim 14, wherein the outer shade element comprises a substantially cylindrical shape.

29. A lighting fixture, comprising:
a plurality of panels solvent-welded together without hardware at corresponding flanges, thereby forming an outer shade element;
a plurality of panels welded together without hardware at corresponding flanges of the plurality of panels, thereby forming an inner shade element;
the inner shade element forming a cavity with a passageway therethrough;
a bottom panel solvent welded to the outer shade element and the inner shade element without hardware;

a top panel solvent welded to the outer shade element and the inner shade element without hardware; and a diffusion layer, wherein the diffusion layer is applied to at least one of the panels forming the outer shade element, inner shade element, bottom panel, or top panel;

wherein:

the plurality of panels in the outer shade element and inner shade element comprise translucent thermoplastic resin sheets;

the lighting fixture includes one or more light sources.

30. The lighting fixture as recited in claim 29, wherein the corresponding flanges in the plurality of panels forming the outer shade element are bent inward and away from an outer surface of the plurality of panels.

31. The lighting fixture as recited in claim 29, wherein the corresponding flanges in the plurality of panels forming the inner shade element are bent inward and away from an outer surface of the plurality of panels.

32. The lighting feature as recited in claim 29, wherein the plurality of panels of the outer shade element have a thickness greater than about 1/16", and wherein the plurality of panels of the inner shade element have a thickness greater than about 1/16".

33. The lighting fixture as recited in claim 29, wherein at least one of the panels forming the outer shade element, inner shade element, bottom panel, or top panel is textured, such that the textured panel comprises a surface roughness that deflects and diffuses light emitted by the one or more light sources.

34. The lighting fixture as recited in claim 29, wherein the diffusion layer comprises a coating applied to a panel surface.

35. The lighting fixture as recited in claim 34, wherein the coating comprises a translucent film.

36. The lighting fixture as recited in claim 34, wherein the coating comprises a translucent paint.

37. The lighting fixture as recited in claim 29, wherein the plurality of panels of the outer shade element form one or more corners.

38. The lighting fixture as recited in claim 37, wherein the outer shade element comprises a substantially square or rectangular shape.

39. The lighting fixture as recited in claim 29, wherein the plurality of panels of the outer shade element form a substantially cylindrical shape.

40. The lighting fixture as recited in claim 29, further comprising:

one or more mounting elements coupled to the lighting fixture;

wherein the one or more mounting elements couple one or more panels selected from the outer shade element, the inner shade element, the top panel, and bottom panel of the lighting fixture to a support surface.

* * * * *